(12) United States Patent
Agarwal et al.

(10) Patent No.: US 8,300,629 B2
(45) Date of Patent: Oct. 30, 2012

(54) DEVICE AND METHOD FOR PROVIDING INTERACTION MANAGEMENT FOR COMMUNICATION NETWORKS

(75) Inventors: Kaitki Agarwal, Westford, MA (US); Rajat Ghai, Sandwich, MA (US)

(73) Assignee: Cisco Technology, Inc., San Jose, CA (US)

( * ) Notice: Subject to any disclaimer, the term of this patent is extended or adjusted under 35 U.S.C. 154(b) by 1332 days.

(21) Appl. No.: 11/952,953

(22) Filed: Dec. 7, 2007

(65) Prior Publication Data

US 2008/0137646 A1    Jun. 12, 2008

Related U.S. Application Data

(60) Provisional application No. 60/873,493, filed on Dec. 7, 2006.

(51) Int. Cl.
*H04L 12/66* (2006.01)
*H04J 3/16* (2006.01)

(52) U.S. Cl. .................. 370/352; 370/465; 370/466

(58) Field of Classification Search .................. 370/352, 370/465–466
See application file for complete search history.

(56) References Cited

U.S. PATENT DOCUMENTS

| | | | |
|---|---|---|---|
| 6,138,156 A | 10/2000 | Fletcher et al. |
| 6,327,471 B1 | 12/2001 | Song |
| 6,431,875 B1 | 8/2002 | Elliott et al. |
| 6,477,590 B1 | 11/2002 | Habusha et al. |
| 6,687,252 B1 | 2/2004 | Bertrand et al. |
| 6,714,987 B1 | 3/2004 | Amin et al. |
| 6,775,273 B1 | 8/2004 | Kung et al. |
| 6,778,494 B1 | 8/2004 | Mauger |
| 6,810,259 B1 | 10/2004 | Zhang |
| 6,847,991 B1 | 1/2005 | Kurapati |
| 6,853,630 B1 | 2/2005 | Manning |
| 6,854,014 B1 | 2/2005 | Amin et al. |
| 6,888,821 B2 | 5/2005 | Rasanen et al. |
| 6,973,309 B1 | 12/2005 | Rygula et al. |
| 6,978,380 B1 | 12/2005 | Husain et al. |
| 7,454,206 B1 | 11/2008 | Phillips et al. |

(Continued)

FOREIGN PATENT DOCUMENTS

EP          1414212          4/2004

(Continued)

OTHER PUBLICATIONS

3GPP, Digital cellular telecomunication system (Phase 2+), Mar. 2006, ETSI TS 123 002, V 7.1.0.*

(Continued)

*Primary Examiner* — Asad Nawaz
*Assistant Examiner* — Nicholas Jensen
(74) *Attorney, Agent, or Firm* — Wilmer Cutler Pickering Hale and Dorr LLP

(57) ABSTRACT

Systems and methods for providing interaction management to network devices in a communication network are described. A gateway may be used to implement the interaction capabilities on packet flows for IP multimedia subsystem (IMS) and multimedia domain (MMD) architectures. Interaction managers and proxy agents can be provided by the gateway, such as a service control interaction manager (SCIM). The SCIM can be a layer and manage interactions between network devices such as mobile nodes and application servers and can provide abstraction of network devices. This can allow the gateway to provide interworking between network devices and handle mobile nodes with different capabilities.

20 Claims, 9 Drawing Sheets

U.S. PATENT DOCUMENTS

| | | | |
|---|---|---|---|
| 7,613,836 | B2 | 11/2009 | Tober et al. |
| 7,792,275 | B2 * | 9/2010 | Tai et al. ............... 379/265.09 |
| 2002/0029260 | A1 | 3/2002 | Dobbins et al. |
| 2002/0131404 | A1 | 9/2002 | Mehta et al. |
| 2003/0016630 | A1 | 1/2003 | Vega-Garcia et al. |
| 2003/0050076 | A1 | 3/2003 | Watanabe |
| 2003/0058872 | A1 | 3/2003 | Berggreen et al. |
| 2003/0188012 | A1 | 10/2003 | Ford |
| 2003/0227880 | A1 | 12/2003 | Heller et al. |
| 2004/0006573 | A1 | 1/2004 | Takashi |
| 2004/0047290 | A1 | 3/2004 | Komandur et al. |
| 2004/0054929 | A1 | 3/2004 | Serpa |
| 2004/0068574 | A1 | 4/2004 | Costa Requena et al. |
| 2004/0109414 | A1 | 6/2004 | Choi et al. |
| 2004/0109459 | A1 | 6/2004 | Madour et al. |
| 2004/0111476 | A1 | 6/2004 | Trossen et al. |
| 2004/0122954 | A1 | 6/2004 | Shaheen |
| 2004/0122967 | A1 | 6/2004 | Bressler et al. |
| 2004/0137918 | A1 | 7/2004 | Varonen et al. |
| 2004/0139230 | A1 | 7/2004 | Kim |
| 2004/0224688 | A1 | 11/2004 | Fischer |
| 2005/0002381 | A1 | 1/2005 | Westman et al. |
| 2005/0005025 | A1 | 1/2005 | Harville et al. |
| 2005/0009520 | A1 | 1/2005 | Herrero et al. |
| 2005/0021713 | A1 | 1/2005 | Dugan et al. |
| 2005/0083974 | A1 | 4/2005 | Mayer et al. |
| 2005/0111450 | A1 | 5/2005 | Miyamoto et al. |
| 2005/0124341 | A1 | 6/2005 | Myllymaki et al. |
| 2005/0190740 | A1 | 9/2005 | Zhao et al. |
| 2005/0201357 | A1 | 9/2005 | Poyhonen |
| 2005/0204052 | A1 | 9/2005 | Wang et al. |
| 2005/0233727 | A1 | 10/2005 | Poikselka et al. |
| 2006/0031559 | A1 | 2/2006 | Sorokopud et al. |
| 2006/0046714 | A1 | 3/2006 | Kalavade |
| 2006/0058056 | A1 | 3/2006 | Das et al. |
| 2006/0067244 | A1 | 3/2006 | Sekaran et al. |
| 2006/0104431 | A1 | 5/2006 | Emery et al. |
| 2006/0146792 | A1 | 7/2006 | Ramachandran et al. |
| 2006/0155871 | A1 | 7/2006 | Ilkka et al. |
| 2006/0193295 | A1 | 8/2006 | White et al. |
| 2006/0211423 | A1 | 9/2006 | Ejzak et al. |
| 2006/0239255 | A1 | 10/2006 | Ramachandran et al. |
| 2006/0251050 | A1 | 11/2006 | Karlsson |
| 2006/0256751 | A1 | 11/2006 | Jagadeesan et al. |
| 2006/0256779 | A1 | 11/2006 | Lim et al. |
| 2006/0264213 | A1 | 11/2006 | Thompson |
| 2006/0270404 | A1 * | 11/2006 | Tuohino et al. ............ 455/432.3 |
| 2007/0022199 | A1 | 1/2007 | Tatsubori |
| 2007/0025301 | A1 | 2/2007 | Petersson et al. |
| 2007/0036078 | A1 | 2/2007 | Chowdhury et al. |
| 2007/0036079 | A1 | 2/2007 | Chowdury et al. |
| 2007/0041320 | A1 | 2/2007 | Chen et al. |
| 2007/0058561 | A1 | 3/2007 | Virgile |
| 2007/0066286 | A1 | 3/2007 | Hurtta |
| 2007/0071221 | A1 * | 3/2007 | Allen et al. ............... 379/265.01 |
| 2007/0076729 | A1 | 4/2007 | Takeda |
| 2007/0082681 | A1 | 4/2007 | Kim et al. |
| 2007/0088836 | A1 * | 4/2007 | Tai et al. ............... 709/227 |
| 2007/0097967 | A1 | 5/2007 | Kauppinen et al. |
| 2007/0156869 | A1 | 7/2007 | Galchev et al. |
| 2007/0206515 | A1 | 9/2007 | Andreasen et al. |
| 2007/0206617 | A1 | 9/2007 | Andreasen et al. |
| 2007/0209061 | A1 | 9/2007 | Dekeyzer et al. |
| 2007/0253371 | A1 | 11/2007 | Harper et al. |
| 2007/0254673 | A1 | 11/2007 | Stenberg et al. |
| 2008/0002592 | A1 | 1/2008 | Yegani et al. |
| 2008/0013533 | A1 * | 1/2008 | Bogineni et al. ............ 370/389 |
| 2008/0020775 | A1 | 1/2008 | Willars |
| 2008/0052387 | A1 | 2/2008 | Heinz et al. |
| 2008/0084867 | A1 | 4/2008 | Foti et al. |
| 2008/0095339 | A1 | 4/2008 | Elliott et al. |
| 2008/0130637 | A1 | 6/2008 | Kant et al. |
| 2008/0137541 | A1 | 6/2008 | Agarwal et al. |
| 2008/0219218 | A1 | 9/2008 | Rydnell et al. |
| 2008/0233947 | A1 | 9/2008 | Herrero-Veron |
| 2008/0254768 | A1 | 10/2008 | Faccin |
| 2009/0054037 | A1 | 2/2009 | Kaippallimalil |
| 2009/0109845 | A1 | 4/2009 | Andreasen et al. |
| 2009/0285225 | A1 | 11/2009 | Dahod |
| 2012/0020350 | A1 * | 1/2012 | Tai et al. ............... 370/352 |

FOREIGN PATENT DOCUMENTS

| | | |
|---|---|---|
| EP | 2092766 | 8/2009 |
| WO | WO-01/22642 | 3/2001 |
| WO | WO-2007/081727 | 7/2007 |
| WO | WO-2008/070869 | 6/2008 |
| WO | WO-2009/067445 | 5/2009 |

OTHER PUBLICATIONS

Service Capability Interaction Management (SCIM) in IMS by Michael Palmeter Blog, Feb. 7, 2006, archived May 12, 2006.*

International Search Report and Written Opinion issued for corresponding International Patent Application No. PCT/US2007/086802.

Nguyen-Vuong. "Mobility Management in $G Wireless Heterogeneous Networks", PhD thesis. Jul. 2, 2008. biblio.univ.evry.fr/theses/2008/2008EVRY00007.pdf (225 pages).

International Search Report and Written Opinion for PCT Application No. PCT/US2008/83911 issued on Jan. 12, 2009 (5 pages).

International Search Report and Written Opinion for PCT Application No. PCT/US2007/000132 mailed on Oct. 2, 2007 (12 pages).

International Search Report and Written Opinion for PCT Application No. PCT/US07/86886 mailed Apr. 10, 2008 (4 pages).

International Search Report and Written Opinion for PCT Application No. PCT/US07/86808 issued on Apr. 10, 2008 (4 pages).

International Search Report and Written Opinion for International Application No. PCT/US09/64823 mailed Feb. 12, 2010 (1 page).

International Search Report and Written Opinion for corresponding PCT Application No. PCT/US07/86884 issued on Apr. 10, 2008 (4 pages).

3gpp.org, 3GPP TS 24.229 V6.12.0 (Sep. 2006), Oct. 3, 2006 (2 pages).

CT Labs Report, "SIP and RTP Denial of Service Attack Tests Summary Report", pp. 1-4, 2005.

International Search Report for corresponding International Patent Application No. PCT/US2009/043696, issued Jun. 24, 2009 (5 pages).

International Search Report and Written Opinion issued for International Patent Application No. PCT/US2007/086747 issued on May 7, 2008 (6 pages).

acmepacket.com/html/page.asp?PageID=%7bFB2657BA-EE7A-46C1-BEA8-F650C93BF5C3%7d>printed on Dec. 5, 2009 (19 pages).

3gpp.org/ftp/Specs/html-info/24229.htm>printed on Dec. 5, 2009 (4 pages).

3GPP TS 36.413 v8.3.0 (Sep. 2008), 3rd Generation Partnership Project; Technical Specification Group Radio Access Network; Evolved Univeral Terrestrial Radio Access Network (E-UTRANO; S1 Application Protocol (S1AP) (Release 8), http://www.3gpp.org (2 pages).

3GPP TS 29.274 v1.3.0 (Oct. 2008), 3rd Generation Partnership Project; Technical Specification Group Core Network and Terminals; 3GPP Evolved Packet System; Evolved GPRS Tunnelling Protocol for Control Plane (GTPv2-C0; Stage 3 (Release 8); http://www.3gpp.org (1 page).

3GPP TS 23.401 v8.3.0 (Sep. 2008), 3rd Generation Partnership Project; Technical Specification Group Services and System Aspects; General Packet Radio Services (GPRS) enhancements for Evolved Univeral Terrestrial Radio Access Network (E-UTRAN) access (Release 8), http://www.3gpp.org (39 pages).

Gouya, et al., "SCIM (Service Capability Interaction Manager) Implementation Issues in IMS Service Architecture", IEEE International Conference on Communications, Jun. 2006 (6 pages).

* cited by examiner

DEVICE AND METHOD FOR PROVIDING INTERACTION MANAGEMENT FOR COMMUNICATION NETWORKS

CROSS REFERENCE TO RELATED APPLICATION

This application claims benefit under 35 U.S.C. §119(e) of U.S. Provisional Patent Application No. 60/873,493, entitled "Apparatus and Method for Providing a Call Session Control Function," filed Dec. 7, 2006, which is hereby incorporated by reference herein in its entirety.

FIELD OF THE DISCLOSURE

This disclosure relates to a system and method for providing interaction management among network devices in a communication network.

BACKGROUND

Wireless communication systems and networks are used in connection with many applications, including, for example, satellite communications systems, portable digital assistants (PDAs), laptop computers, and cellular telephones. One significant benefit that users of such applications obtain is the ability to connect to a network (e.g., the Internet) as long as the user is within range of such a wireless communication system.

Current wireless communication systems use either, or a combination of, circuit switching and packet switching in order to provide mobile data services to a mobile node. A mobile node can be a cell phone, a PDA, a Blackberry, a laptop computer with a wireless card, or any other wireless device. Generally speaking, with circuit-based approaches, wireless data is carried by a dedicated (and uninterrupted) connection between the sender and recipient of data using a physical switching path. Once the direct connection is setup, it is maintained for as long as the sender and receiver have data to exchange. The establishment of such a direct and dedicated switching path results in a fixed share of network resources being tied up until the connection is closed. When the physical connection between the sender and the receiver is no longer desired, it is torn-down and the network resources are allocated to other users as necessary.

Packet-based approaches, on the other hand, do not permanently assign transmission resources to a given call, and do not require the setup and teardown of physical connections between a sender and receiver of data. In general, a data flow in packet-based approaches is "packetized," where the data is divided into separate segments of information, and each segment receives "header" information that may provide, for example, source information, destination information, information regarding the number of bits in the packet, priority information, and security information. The packets are then routed to a destination independently based on the header information. The packet flow may include a number of packets or a single packet. Services may be applied to a packet flow such as lawful interception (wire tapping), Virtual Private Networks (VPNs), and firewalls.

A part of the evolution of packet based communications has been the development of IP Multimedia Subsystem (IMS). IMS is an architectural framework for delivering internet protocol (IP) multimedia to mobile nodes. A call session control function (CSCF) can manage much of the signaling that occurs in an IMS core. The CSCF functionality can be logically divided into three functionalities: a Proxy-CSCF (P-CSCF), an Interrogating CSCF (I-CSCF), and a Serving CSCF (S-CSCF). Additionally, the CSCF functionality is envisioned by two different groups for inclusion in two different topologies: Global System for Mobile Communications (GSM) and CDMA 2000. The $3^{rd}$ Generation Partnership Project (3GPP) is responsible for IMS which works with GSM systems and the $3^{rd}$ Generation Partnership Project 2 (3GPP2) is responsible for Multimedia Domain (MMD) which is used with CDMA systems and is based on the 3GPP IMS concept. The current IMS standards place a lot of responsibility on application servers to manage the mobile nodes requesting content and services and to communicate within certain parameters. With the fast pace of development, there are a number mobile nodes with varying capabilities as well as a number of application servers with varying capabilities and all application servers may not be fully IMS compliant.

SUMMARY OF THE DISCLOSURE

Systems and methods for providing interaction management among network devices in a communication network are disclosed. In some embodiments, a gateway in a communication network includes a service control interaction manager (SCIM) residing in the gateway which provides management of services and management of interactions in the communication network, a call session control function (CSCF) in communication with the SCIM and residing in the gateway, which handles session initiation protocol sessions and interworking, and a computer readable medium storing filter criteria and triggers which are used to determine service changes.

In certain embodiments, an interaction management method includes receiving a message at a gateway in a communication network, analyzing the message at the gateway in a service control interaction manager (SCIM), determining if the request matches filter criteria to change a service provided to a mobile node, communicating instructions from the SCIM to a call session control function (CSCF), determining processing to perform at the gateway including interworking at the CSCF on the message, wherein the interworking is between an IP Multimedia Subsystem (IMS) network and a non-compliant network device, and receiving at the gateway a packet flow from a network device and processing the packet flow to manage service level interaction between the network device and the communication network.

DETAILED DESCRIPTION

Systems and methods for providing interaction management to network devices in a communication network are disclosed in some embodiments. A gateway may be used to implement the interaction capabilities on packet flows for IP multimedia subsystem (IMS) and multimedia domain (MMD) architectures. Interaction managers and proxy agents can be provided by a combination of hardware and software. Residing within the gateway can be one or more network processing units, line cards, as well as packet and voice processing cards. In some embodiments, a service control interaction manager (SCIM) is provided. The SCIM can be a layer in some embodiments and manage interactions between the mobile nodes and application servers and can provide abstraction of network devices.

The SCIM can provide abstraction of one or more mobile nodes to the network and one or more application servers, for example. This can include managing the capabilities of each mobile node and processing the packet flows or messages so that application server(s) need not consider the full range of mobile node capabilities in the provision of services and/or features. The SCIM can also provide abstraction of the application servers when features are provided to the mobile node. The SCIM and serving-call session control function (S-CSCF) can manage the application servers to provide features and services to the mobile node and provide load balancing among the application servers. SCIM can manage interaction among application servers, e.g., interact with a PRESENCE server and a Calendar server to manage presence at a particular time in the day. Some users may want to block their presence when they are in a meeting.

Figure 1:
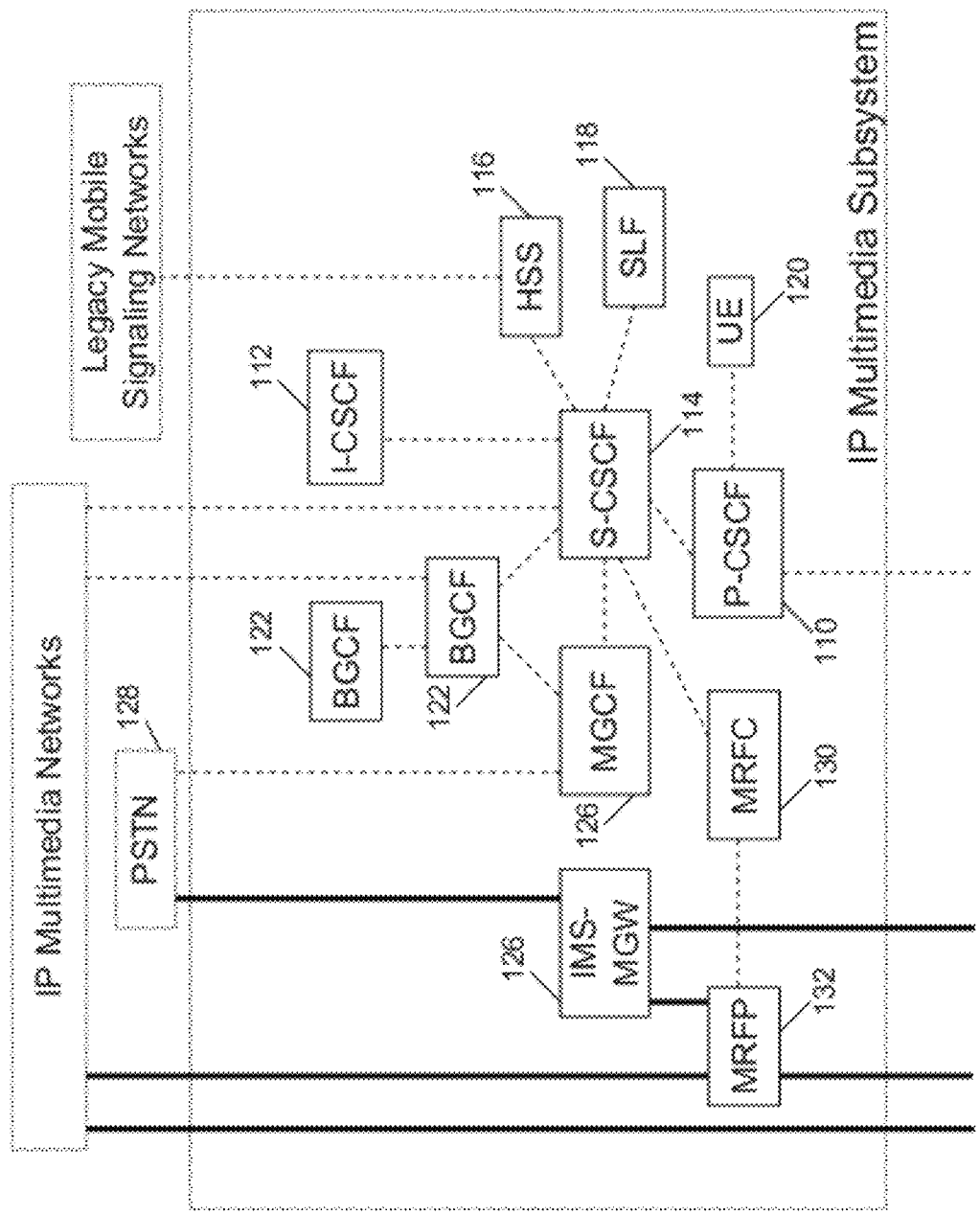
FIG. 1 is a block diagram illustrating an IP multimedia subsystem (IMS) architecture in accordance with certain embodiments.

FIG. 1 illustrates an IP multimedia subsystem (IMS) where logical components of a network architecture are shown in accordance with some embodiments. The SCIM can manage interactions to and from legacy devices and IMS capable devices. FIG. 1 includes a P-CSCF 110, an I-CSCF 112, a S-CSCF 114, a Home Subscriber Server (HSS) 116, a Subscriber Location Function (SLF) 118, user equipment (UE) 120, Breakout Gateway Control Function (BGCF) 122, Media Gateway Control Function (MGCF) 124, Media Gateway (MGW) 126, Public Switched Telephone Network (PSTN) 128, Multimedia Resource Controller (MRFC) 130, and Multimedia Resource Function Processor (MRFP) 132. HSS 116 is a master user database that supports the S-CSCF or other network entities that handle calls and sessions. HSS 116 stores subscription-related information such as user profiles, performs user authentication and authorization, and can provide information about the physical location of the user. When multiple HSSs are used in a network a SLF 118 can be used to direct the queries to HSS 116 storing the information. Legacy signaling networks may also use the HSS for services. MRFC 130 communicates with S-CSCF 114 and controls the MRFP 132 to implement media related functions. The combination of MRFC 130 and MRFP 132 provides a source of media in the home network. BGCF 122 is a server that can route based on telephone number and is used when calling to a phone on the circuit switched network. MGCF 124 and MGW 126 are used to convert signaling from IMS to that which is appropriate for PSTN 128 circuit switched networks.

The IP Multimedia Subsystem network can include application servers and other network entities that provide services to user equipment (or mobile node) 120. In some embodiments, a gateway includes P-CSCF 110, I-CSCF 112, S-CSCF 114 among other logical functions and communicates with user equipment (or mobile node) 120.

Figure 2:
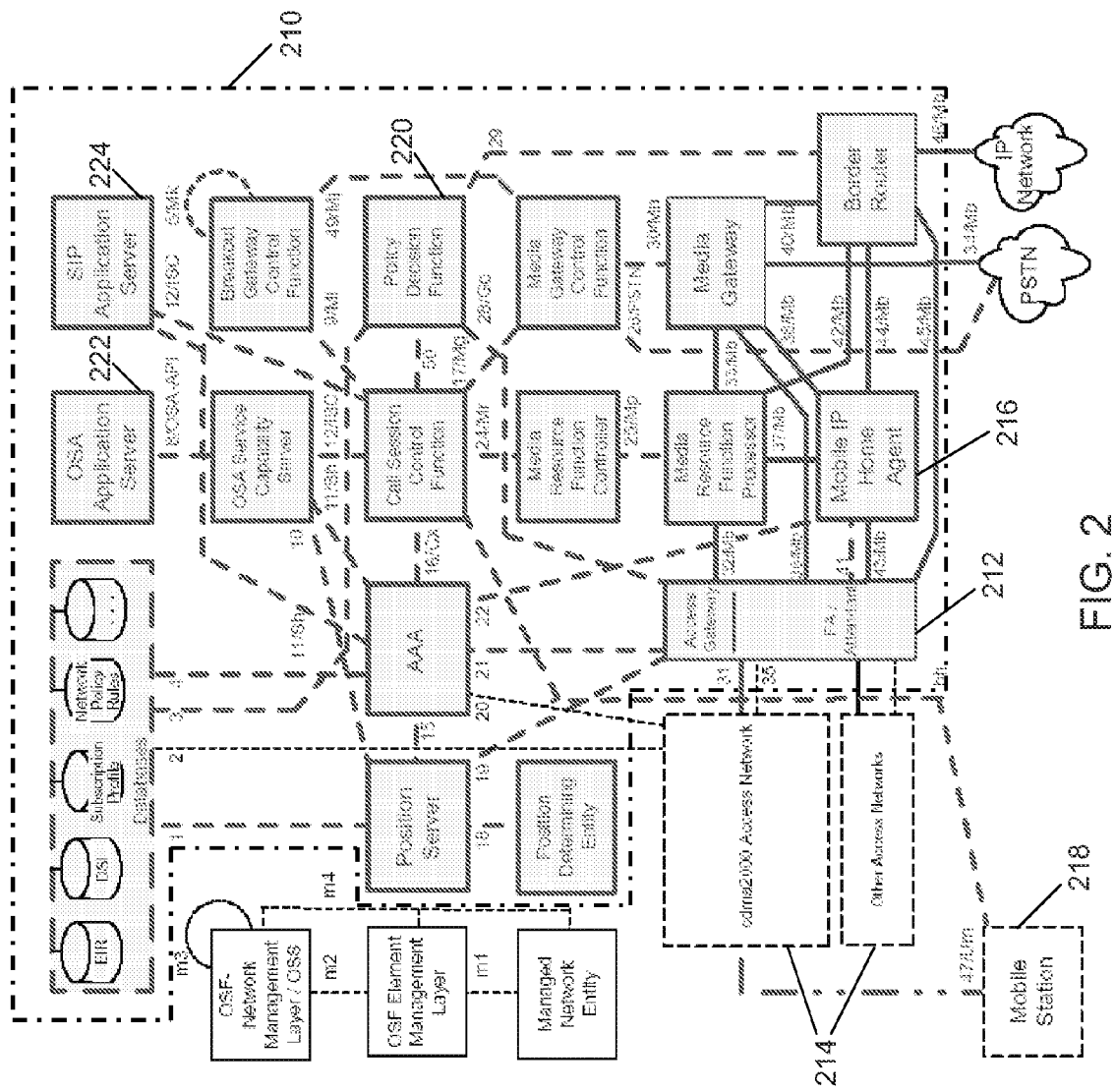
FIG. 2 is a block diagram illustrating a multimedia domain (MMD) architecture in accordance with certain embodiments.

FIG. 2 illustrates a Multimedia Domain (MMD) system 210 within a larger network. The MMD system 210 includes many of the same functions as the IMS system of FIG. 1, but further includes an access gateway/foreign agent 212 to communicate with access networks 214, as well as a home agent 216 to provide Mobile IP support to mobile stations 218 (or mobile node). A policy decision function (PDF), which can be included in a IMS or MMD network stores policies governing a user's session. Application servers can be included in a IMS or MMD network. Application servers such as an open systems architecture (OSA) application server 222 and SIP application server 224 provide applications such as location based services, video, email, chat, gaming, and other data and multimedia content.

As shown in FIGS. 1 and 2 a number of functions can be included in IMS and MMD topologies. Several of these functions are used in providing, for example, voice over IP (VoIP) routing and enhanced services, such as enhanced charging, stateful firewalls, traffic performance optimization (TPO). In some embodiments, one or more of these functions can be provided by a single entity in the network such as a gateway. The IMS and MMS topologies also allow provision of applications such as VoIP, streaming video, streaming music, multi-user gaming, location based services, and a variety of content delivered to a mobile node.

Figure 3:
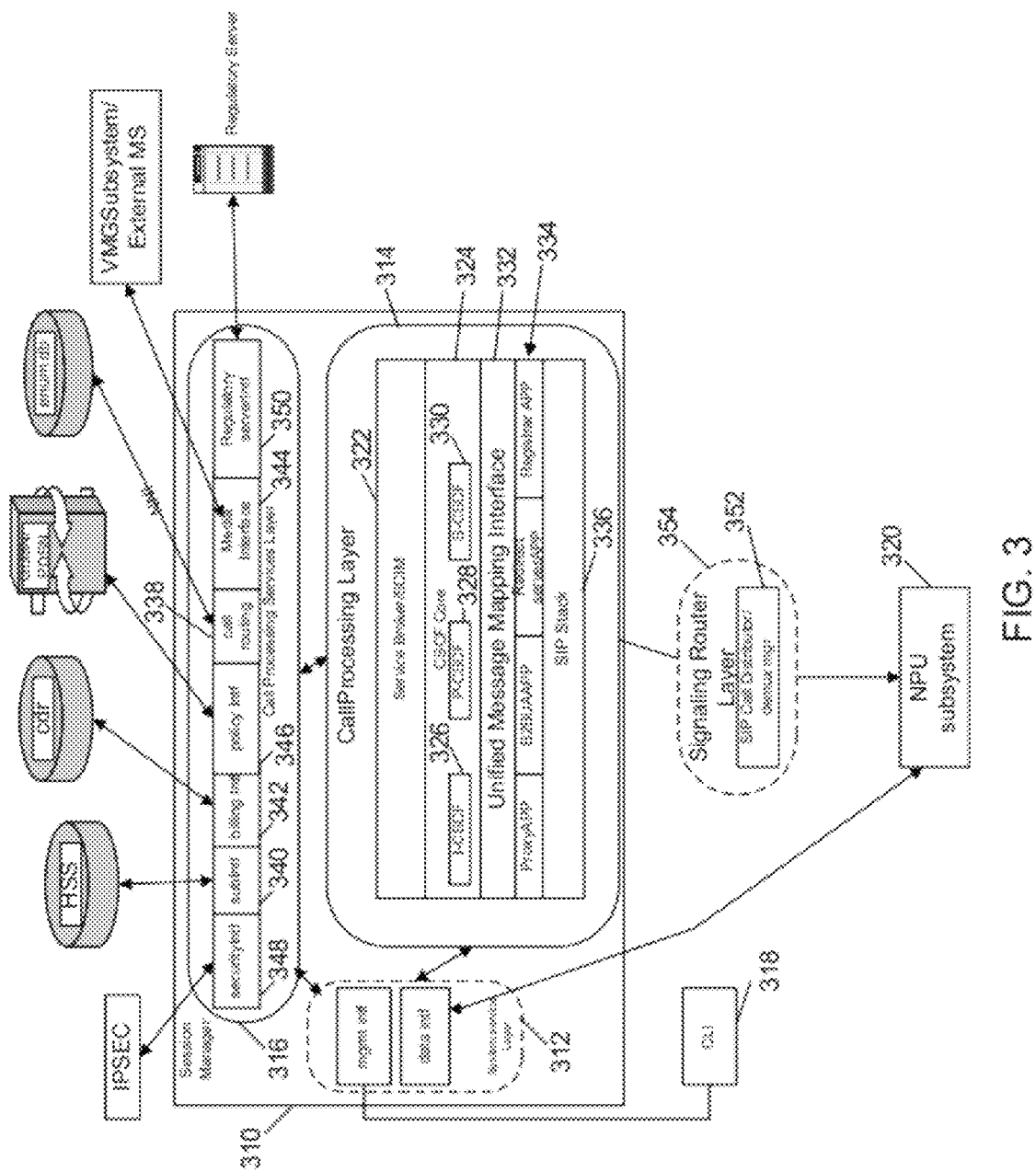
FIG. 3 is a block diagram illustrating modules running on a gateway in accordance with certain embodiments.

FIG. 3 illustrates a control plane architecture that can be used to implement interaction management in a gateway in accordance with certain embodiments. A session manager 310 services and processes user session data flow for user equipment/mobile subscribers. Session manager 310 includes functional layers such as a system service layer 312, a call processing layer 314, and a call processing support services layer 316. In certain embodiments, SCIM can be a functional layer within the gateway. The system services layer 312 provides an interface for instructions to be passed to the session manager and the other layers. A command line interface (CLI) 318 can be provided. Network processing unit 320 can be used to provide packet flows and for other processing. The call processing layer 314 includes a service broker/Service Control Interaction Manager (SCIM) 322, a CSCF core 324 that includes an I-CSCF 326, P-CSCF 328, and S-CSCF 330, a unified message mapping interface 332, applications 334, and a SIP stack 336. In some embodiments, the CSCF core includes one of the CSCF functionalities, for example, the P-CSCF. The call processing support services layer 316 includes a variety of services such as routing and address translation service 338, subscriber management service 340, changing interface service 342, media interface service 344, QoS policy interface service 346, security interface 348, and regulatory server interface 350.

Looking at the call processing layer 314, this layer includes signaling protocols and call control using universal SIP as an application program interface (API). The signaling protocols can be SIP or can be other protocols like ISUP, MGCP, or H.323. Further, the call processing layer 314 allows interworking between SIP variants and other protocols through a unified mapping interface. The unified mapping interface can convert protocol specific messages and parameters to a universal SIP like API format. SIP like messaging is used, in some embodiments, because SIP has the largest message set and can cover the possible messaging scenarios for SIP and the other protocols. The call processing layer 314 can also provide transparency to data that need not be processed by the CSCF core by placing that information into an envelope. Parameters that are not of interest can be placed in an envelope and remain unmodified. The CSCF core allows any text string as the calling and called number, and the number does not need to be restricted to an E.164 number. The number could be, for example, an Address of Record (AoR) or any name string with a domain name.

A demux manager 352 resides in the signal routing layer 354, as shown in FIG. 3. The signal routing layer 354 with the demux manager can determine where a packet flow is sent for processing. The packet flow can be sent to a process instance for further processing and/or signal handling. The demux manager can be used to analyze packet flows or traffic entering into a gateway. This analyzing may encompass packet sniffing, extracting of information from packet headers, sorting extracted information, deep packet inspection, and processing of information obtained from one or more packets. Messages analyzed by a demux manager can contain information which can be extracted (or sniffed) such as an IP-address assigned to the mobile node, a network access identifier (NAI), an international mobile subscriber identity (IMSI), a mobile subscriber identification (MSID), a correlation-ID (for CDMA implementations), a user data record (UDR), event data records (EDR), a calling-station-ID, and/or any other applicable information.

Service control interaction manager (SCIM) 322 can be a functional layer for enforcement of policies relating to device features and interactions between devices. Legacy mobile nodes were previously designed with the network providing the services. Session initiation protocol (SIP) enabled mobile nodes and next generation mobile nodes are designed with capabilities to handle a number of call features rather than the network. These call features can include call forwarding, hold, transfer, caller ID screening, call waiting, and three-way calling. There are also features that are controlled by the network such as multi-endpoint interaction service (users with multiple phones can have a number ring in different places depending on a criteria), call forwarding when a user has a mobile node turned off, find me/follow me service, multiparty conference, and address book management.

SIP mobile nodes can complicate interaction with the network because some features are provided by the network and others are provided by the mobile node. There can also be problems with legacy mobile nodes communicating with SIP mobile nodes and using features that are to be provided by the SIP mobile nodes. Further mobile nodes can be spread across different access networks and may have totally different feature sets. For example, one phone might have video, voice, and text while another only voice and text. Further, mobile nodes from different generations (e.g., 2G, 2.5G, 3G) can have varying capabilities. Abstraction of the mobile node can ease burdens at the application server and allow for simpler programming of application servers. The SCIM can present the application server with one or more mobile nodes all having the same capabilities with the SCIM handling any modifications to fit the service to the particular mobile node's capabilities.

In providing services to mobile nodes, the SCIM interacts with a S-CSCF. The S-CSCF can obtain the user profile from a subscriber database (e.g., HSS) during registration. This profile can be cached in the session manager or CSCF core for the registration lifetime and updated as new information is received. The user profile can include information about the user as well as any services to which the user is subscribed. The list of services applicable to a user can be included in an initial filter criteria (IFC). The initial filter criteria can be a rule set that determines when to include an application server during call processing based on a variety of matching criteria. The matching criteria can be defined in one or more service point triggers (SPT). The SCIM can analyze and provide information on the next IFC to execute for a user, and update the current IFC by allowing a new set of triggers to be added as new applications are added to the network. The SCIM can also provide a proxy function or a generic infrastructure to execute and apply new triggers during feature interaction. In some embodiments, the SCIM executes IFCs based on static information. In other embodiments, the SCIM executes IFCs based on the dynamic network conditions such as bandwidth requirement and/or local/peer node congestion.

The IFC evaluation provided by the SCIM can occur as follows in some embodiments. IFC can include trigger points that identify when to start, stop, or modify a service or feature. The trigger points can include service point triggers. Service point triggers can include various conditions that are applied to messages determine if a match occurs. The IFC, trigger points, and service point triggers can be obtained from the subscriber database or from a local cache. The data obtained from the subscriber database can include the address of the application server to route a request if there is a match with a trigger condition. Service trigger data can include the following attributes priority, session case, SIP method, request URI, SIP header, and session description protocol (SDP). The priority can define the order of trigger evaluation. The session case can specify if the case is originating, terminating, or terminating unregistered.

The SCIM in fulfilling and processing IFCs can monitor application service availability and can provide load balancing. This can be achieved using a number of methods such as least loaded, round robin, or a calculation based on factors such as load on the processing unit(s), number of active sessions, number of suspended sessions, outstanding requests, and round trip time. In some embodiments, this information is provided in real time or nearly real time so that a determination can be made regarding availability. An application server may not be able to provide service to another session because the application server is experiencing service congestion (e.g., the required quality of service (QoS) is not available to run the service) even though the physical server is available (i.e., the server is not experiencing network congestion).

The S-CSCF can allow the mobile node to control the services in the mobile node, but will check the user's subscription to the service prior to authorizing the mobile node to control the service. For example, if the user is already in a call and is not subscribed to call waiting, the S-CSCF can reject a new incoming call to that user.

SCIM 322 can also manage interactions between the mobile node and legacy application servers, which can include non-IMS compliant SIP servers. In some embodiments, the SCIM hides the details of the mobile node and the device's features from application servers and forwards the features that the mobile node can accept. In certain embodiments, a CSCF can abstract user service capability from the SIP-AS in a SCIM layer. Once the various device characteristics are known, the CSCF can understand and mediate the various device characteristics and can give an illusion to the SIP-AS that all the service users have the same capabilities. This hiding removes the need for the SIP-AS to have to control how to interact with the mobile node. For example, for a PUSH to X service, while the SIP-AS will treat all the users as if they had voice/video and text capabilities, the CSCF can make sure that the users are offered right kind of media types.

PSTN Access users could be offered just 64 kbps voice or H.324M muxed media. A text device would be offered only text, while a SIP video phone could be offered all 3 media types.

On the other side, if mobile node requests a service, such as streaming video, voicemail, or music, the SCIM can direct the request to a legacy non-SIP enabled application server. The SCIM takes the response from the legacy application server and performs any necessary conversions and forwards it on to the mobile node. The SCIM, in some embodiments, promotes interoperability between mobile nodes and application servers. The SCIM can relieve application servers of the burden tracking mobile node capabilities, and can extend the lifespan of legacy equipment (legacy servers or pre-IMS/MMD servers) which can continue to be used because the SCIM is managing how and what content is served to the mobile node. Further, many times these legacy application servers use competing protocols such as H.324M muxed media, direct talk, push-to-talk. The gateway can provide conversion of these competing protocols to extend services between devices that are otherwise incompatible. In some embodiments, service can be provided to an application server that does not support one or more of the SIP extension used for IMS end points to establish IMS session, for example, preconditions, update, and 100 Rel extensions. CSCF core provided interworking can be used to communicate between Internet and/or non IMS SIP application servers and clients. In some embodiments, SIP procedures are used that allow interworking towards the external client. This functionality can be provided as a back-to-back user agent (B2BUA). As a B2BUA, the CSCF core can consult the peering server's capability during the initial route lookup based on the SIP AS information in the subscriber profile, which can be cached in some embodiments.

In some embodiments, a message can be sent to a mobile node to get the capabilities from the mobile node. This message can be an option message. From the information obtained from this message get the media resources. The SCIM can interact between the application servers. For example, the SCIM can send a message to a calendar application server and the calendar application server can report back the services the mobile node can receive during certain hours of the day. The SCIM can then route the call to another application server to handle the call. Additionally, this layer with a CSCF core interworking function can maintain a standard SIP interface into legacy service nodes like IVR/voice mail systems and the CSCF can proxy them and make them look like IMS SIP-ASs (proxy a ISC interface for legacy service nodes), in some embodiments.

Figure 4:
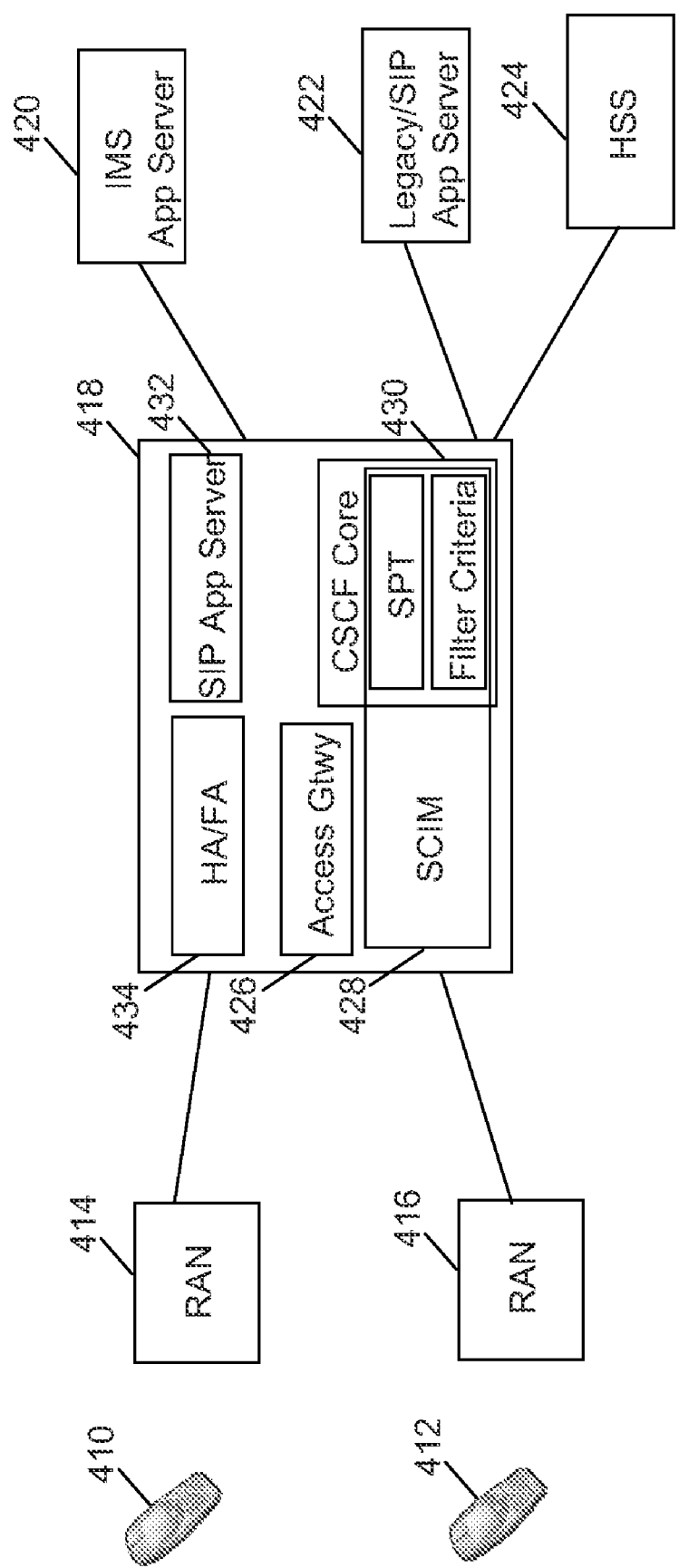
FIG. 4 is a block diagram illustrating a gateway providing interaction management in accordance with certain embodiments.

FIG. 4 illustrates a gateway providing interaction management in accordance with certain embodiments. FIG. 4 includes a mobile node 410, a mobile node 412, a radio access network (RAN) 414, a RAN 416, a gateway 418, a SIP application server 420, a legacy application server 422, and a home subscriber service (HSS) 424. Gateway 418 can include functional or logical units such as access gateway 426, SCIM 428, CSCF core 430 (which includes service point trigger (SPT) and filter criteria), application server 432, and home agent (HA)/foreign agent (FA) 434. The access gateway 426 can include one or more of the following: a packet data serving node (PDSN), a Gateway GPRS Support Node (GGSN), and a user plane entity (UPE), for example. SCIM 428 can overlap with CSCF core 430 to provide filter criteria and to monitor changes in service. SCIM 428 can interact with a S-CSCF (see FIG. 3) whose functionality resides in CSCF core 430 to implement monitoring of packets to match filter criteria and trigger changes in service upon a match. CSCF core 430 can also implement a P-CSCF and an I-CSCF (see FIG. 3).

Gateway 418 can communicate with mobile nodes 410 and 412, SIP application server 420, legacy application server 422, and HSS 424. The mobile nodes shown can be a legacy mobile node 410 and SIP enabled mobile node 412. Gateway 418 can perform processing on packet flows to account for the lack of capabilities of a legacy mobile node 410 for services such as three way calling and video conferencing. This can free up the application server from having to perform this processing, for example, and allow the application server to send a one or more of the same packet flow for the mobile nodes to receive the service. Gateway 418 can communicate with HSS 424 to obtain subscriber information such as filter criteria and use the subscriber information to setup service point triggers in SCIM 428 and CSCF core 430, in some embodiments.

Gateway 418 can also communicate with IMS application server 420 and legacy/SIP application server 422. In some embodiments, an application server 432 can be provided within gateway 418 to fulfill a service request inline with the packet flow. Application server 432 can provide functionalities with less delay than might otherwise occur when using an external application server to fulfill the request. In providing services to mobile nodes 410 and 412, gateway 418 can perform processing on packet flows to provide interworking between a legacy or non-IMS compliant application server and the network. For example, gateway 418 can extend a legacy voicemail application server to an IMS enabled mobile node. When the IMS enabled mobile node requests voicemail, gateway 418 can communicate with the legacy voicemail application server in a first protocol, perform any processing or conversion of the content and/or messaging protocol, and communicate with the IMS enabled mobile node in a second protocol. Gateway 418 can convert both the transport protocols as well as the protocol of the content, in some embodiments. The SCIM 428 along with CSCF core can arrange for the processing and conversion in the gateway in processing cards such as the packet accelerator card or packet services card described below.

Figure 5:
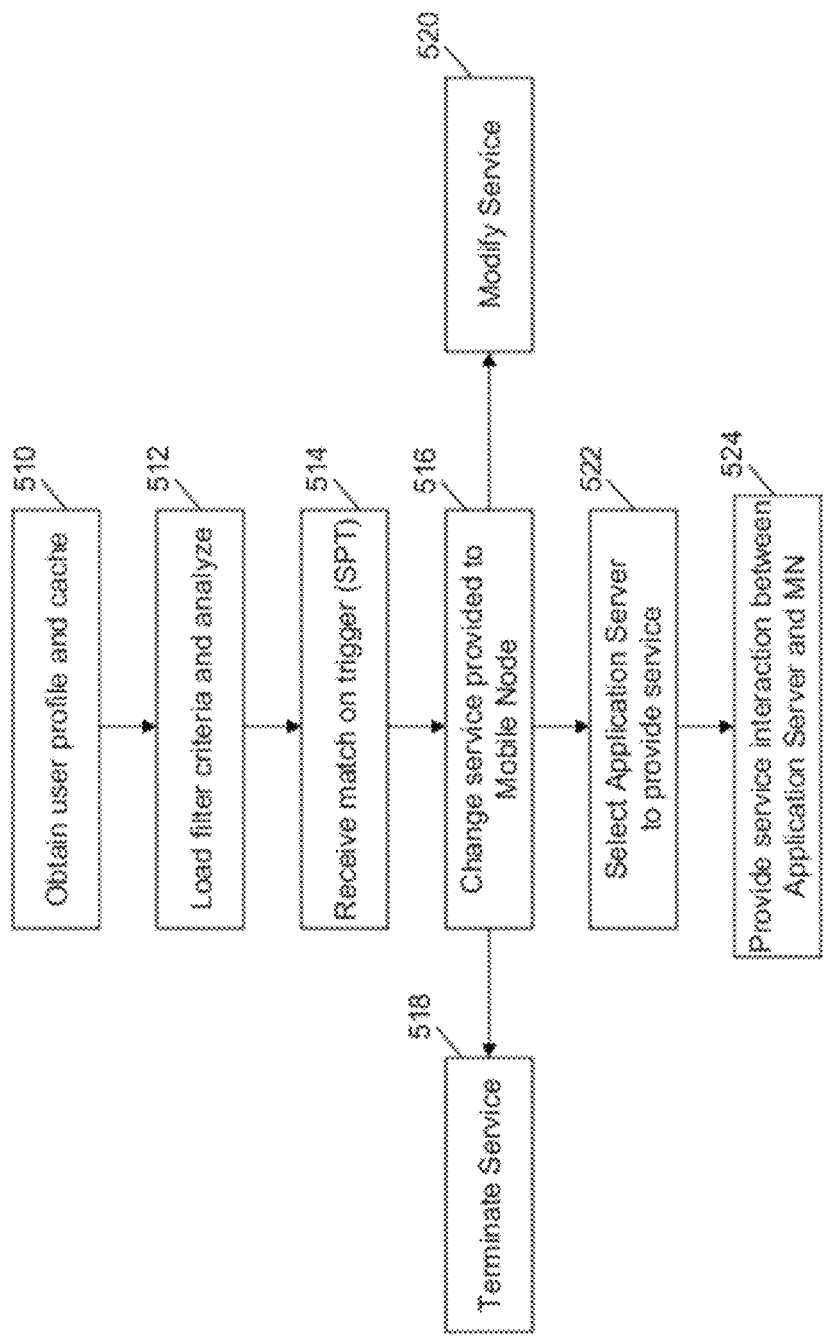
FIG. 5 is a flow diagram illustrating provision of filter criteria in accordance with certain embodiments.

FIG. 5 illustrates steps for providing services at a gateway in accordance with certain embodiments. At step 510, the gateway obtains the user profile and caches the result in a local cache in the session manager. The user profile can be obtained from an external database such as a HSS by the S-CSCF functionality, and is stored in local cache. At step 512, the SCIM can load the fitler criteria from the user profile and analyze the filter criteria. The analysis can include setting up service point triggers (SPT) to trigger service changes based on matches with preset conditions. In some embodiments, service point triggers are setup in a hash hit list, so a packet information can trigger a match in the hash list. At step 514, there is a match on a service point trigger in the gateway. The match can occur in the SCIM layer.

At step 516, the service provided to the mobile node is changed. The service can be terminated at 518, modified at 520, or be newly provided at 522. An example of a service change, step 520, can be adding or dropping a mobile node in a conference, or QoS changes in the provision of a service. A newly provided service can be when a subscriber selects to retrieve voicemail, and the mobile node was previously not connected to the voicemail application server. At 522, an application server is selected to provide the service, for example, services such as voicemail, website viewing, video conferencing, call forwarding, and content filtering. The application server can be selected by the SCIM alone or in combination with a S-CSCF functionality in the CSCF core.

At 524, service interaction management can be provided by the SCIM between the application server and the mobile node.

Figure 6:
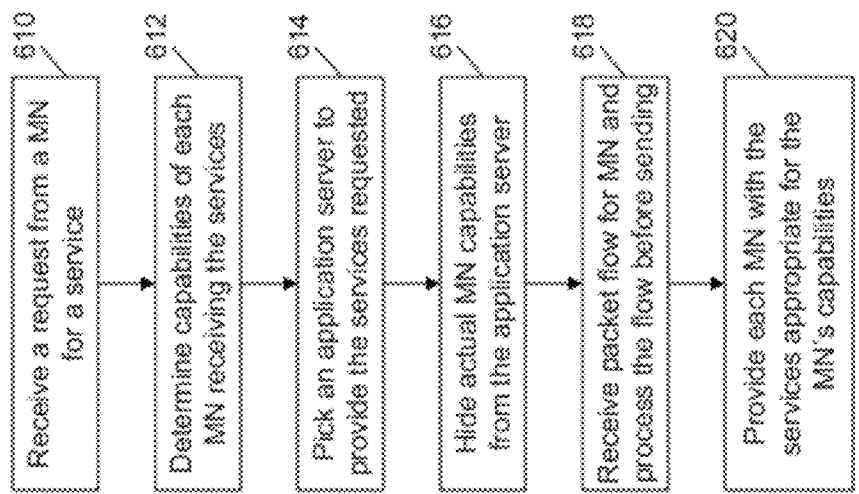
FIG. 6 is a flow diagram illustrating processing at the gateway in accordance with certain embodiments.

FIG. 6 illustrates steps for providing processing at the gateway for a mobile node in accordance with certain embodiments. At step 610, the gateway receives a request for service from a mobile node. The request can be from a mobile node dialing a service (e.g., *45 or 800-888-1234 for getting voicemail) or by selecting an icon on graphic user interface on the mobile node, which prompts a sending of the request. At 612, the gateway and more specifically the SCIM and/or CSCF core determines the capabilities of each mobile node receiving the services. In some instances all the mobile nodes may have the same capabilities so the service can be relayed from the application server without further processing. At 614, SCIM picks an application server to provide the services requested. The SCIM with the help of CSCF session and routing interface can load balance requests using a number of methods to avoid congestion or service delays.

At 616, the SCIM can hide actual mobile node capabilities from the application server when requesting the service. This can involve reporting the mobile nodes as all having the same capabilities, while the mobile nodes may have varying capabilities. By not forcing the application server to provide different levels of service to mobile nodes of varying capabilities, programming for the application server can be simplified and processing burdens can be reduced. Further, legacy equipment's life span can be increased. At 618, the gateway receives a packet flow for one or more mobile nodes and processes the packet flow before sending. The processing can be directed by the SCIM and can involve protocol or format conversion, changing of media because of quality of service (QoS) or bandwidth constraints, or removing content (such as video for a non-video enabled mobile node), for example. At 620, each mobile node is provided with services appropriate for the mobile node's capabilities.

Figure 7:
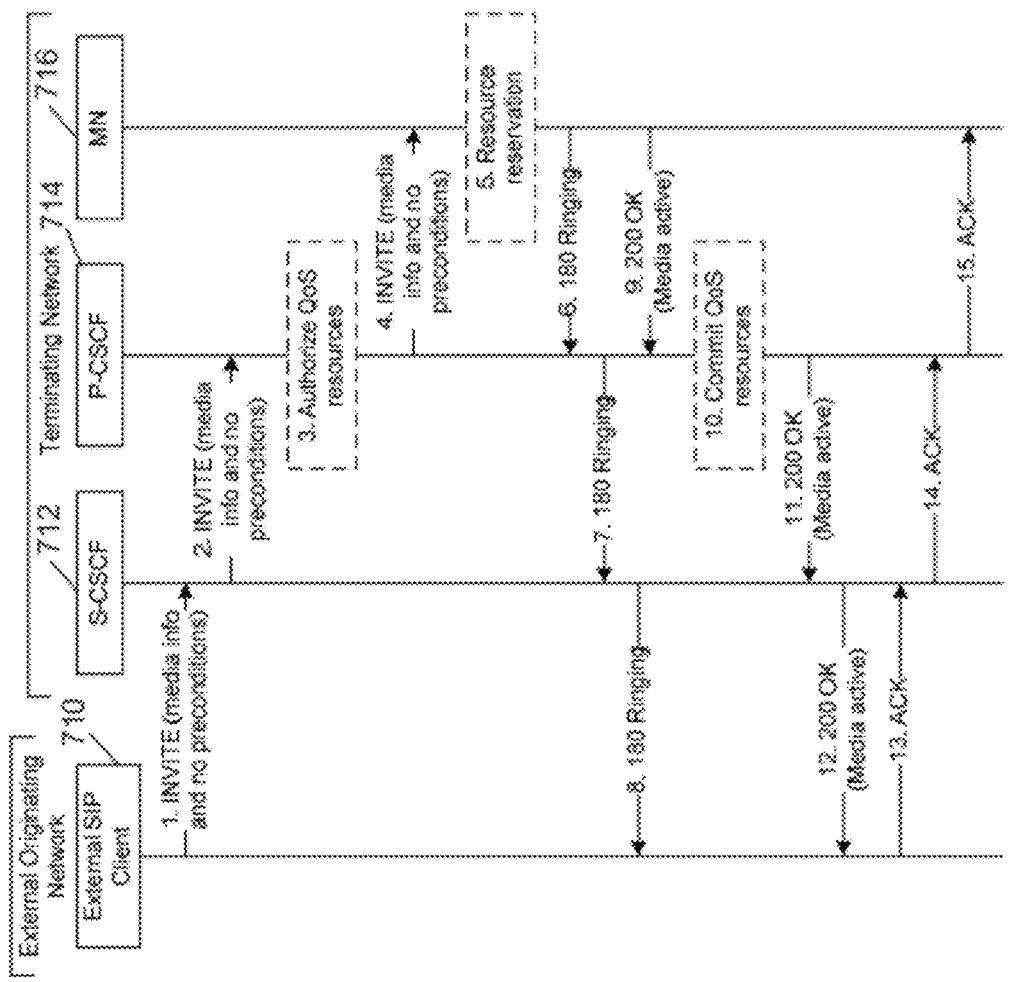
FIG. 7 is a signaling flow illustrating interworking a call from a non-IMS domain in accordance with certain embodiments.

FIG. 7 illustrates interworking from a non-IMS domain in accordance with certain embodiments. In FIG. 7 the interworking involves a call coming from a non-IMS domain and includes an external SIP client 710, a S-CSCF 712, a P-CSCF 714, and a mobile node 716. In step 1, an invite is sent with media information and no preconditions from the external non-IMS SIP client 710 to S-CSCF 712 which resides with the gateway. In step 2, the incite is sent to P-CSCF 714 by S-CSCF 712. In step 3, P-CSCF 714 authorizes QoS resources and sends an invite in step 4. In step 5, mobile node 716 reserves resources and sends a 180 ringing to P-CSCF 714 in step 6. The 180 ringing message is sent along to SIP client 710 in steps 7 and 8. In step 9, a 200 OK is sent to P-CSCF 714 to indicate the media is active and P-CSCF 714 commits the resources. In FIG. 7 interworking is provided between external SIP client 710 and the IMS terminating network. The external SIP client may not be able to support a number of SIP extensions required for IMS end points to set up IMS sessions, so CSCF core in the gateway can provide interworking to allow a session to be setup. Interworking to other non-IMS mobile nodes can also be provided by the gateway by providing a proxy agent within the gateway to manage interactions between the IMS network and the non-IMS mobile node.

Figure 8:
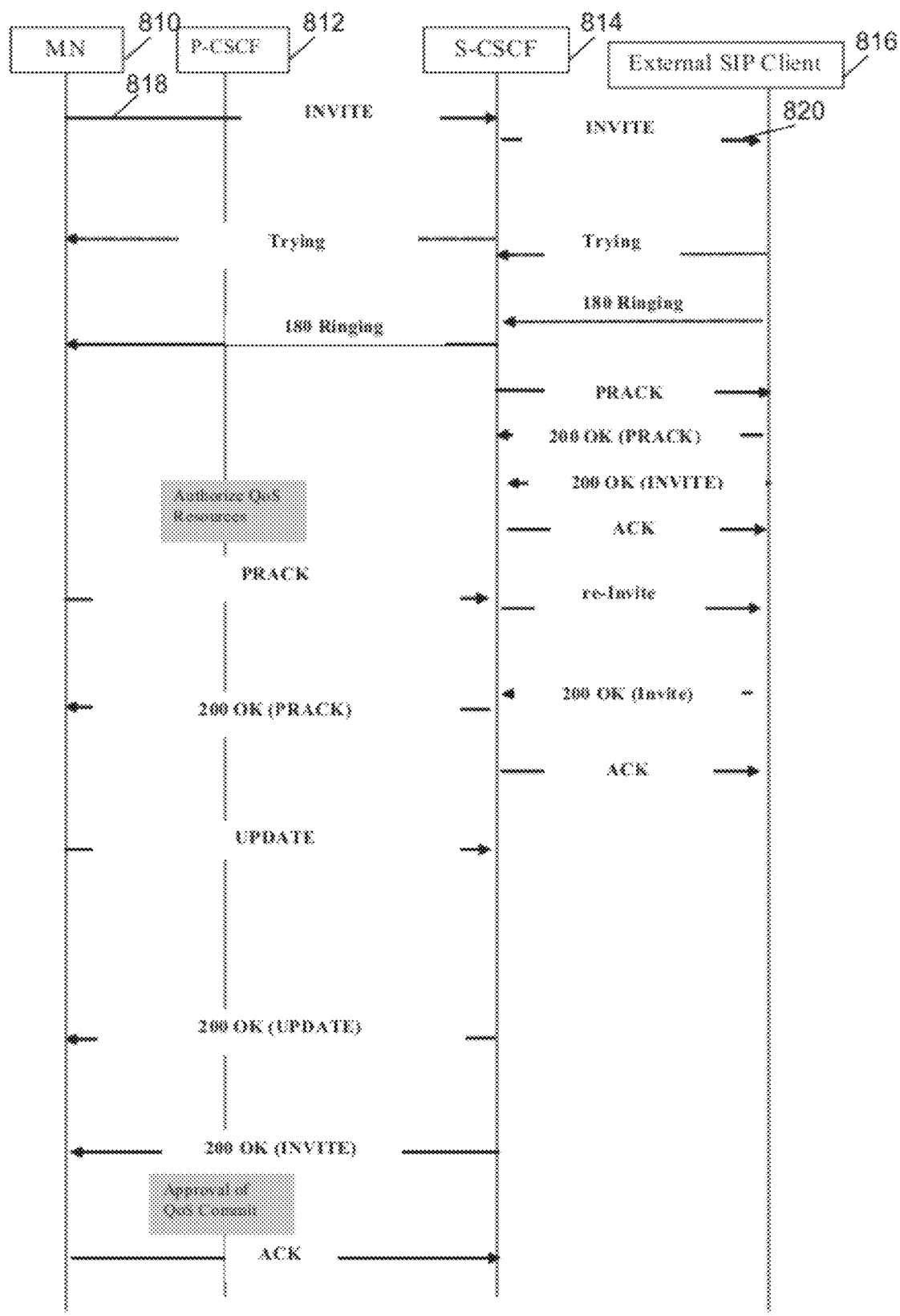
FIG. 8 is a signaling flow illustrating interworking a call going to a non-IMS domain in accordance with certain embodiments.

FIG. 8 illustrates interworking to a non-IMS domain in accordance with certain embodiments. FIG. 8 includes a mobile node 810, a P-CSCF 812, a S-CSCF 814, and an external SIP client 816. In 818 an invite message is sent from an IMS mobile node to S-CSCF 814 which includes information that is not supported by external SIP client 816. S-CSCF can determine that external SIP client is not within the IMS domain and modify the invite 818 to invite 820. This can allow a session setup despite incompatibility problems. S-CSCF 814 can continue to interwork modifying SIP messages in FIG. 8 between mobile node 810 and external SIP client 816. Gateway can also provide a proxy agent that can interwork between an IMS network and non-IMS domain mobile nodes. This can include non-SIP based mobile nodes.

Figure 9:
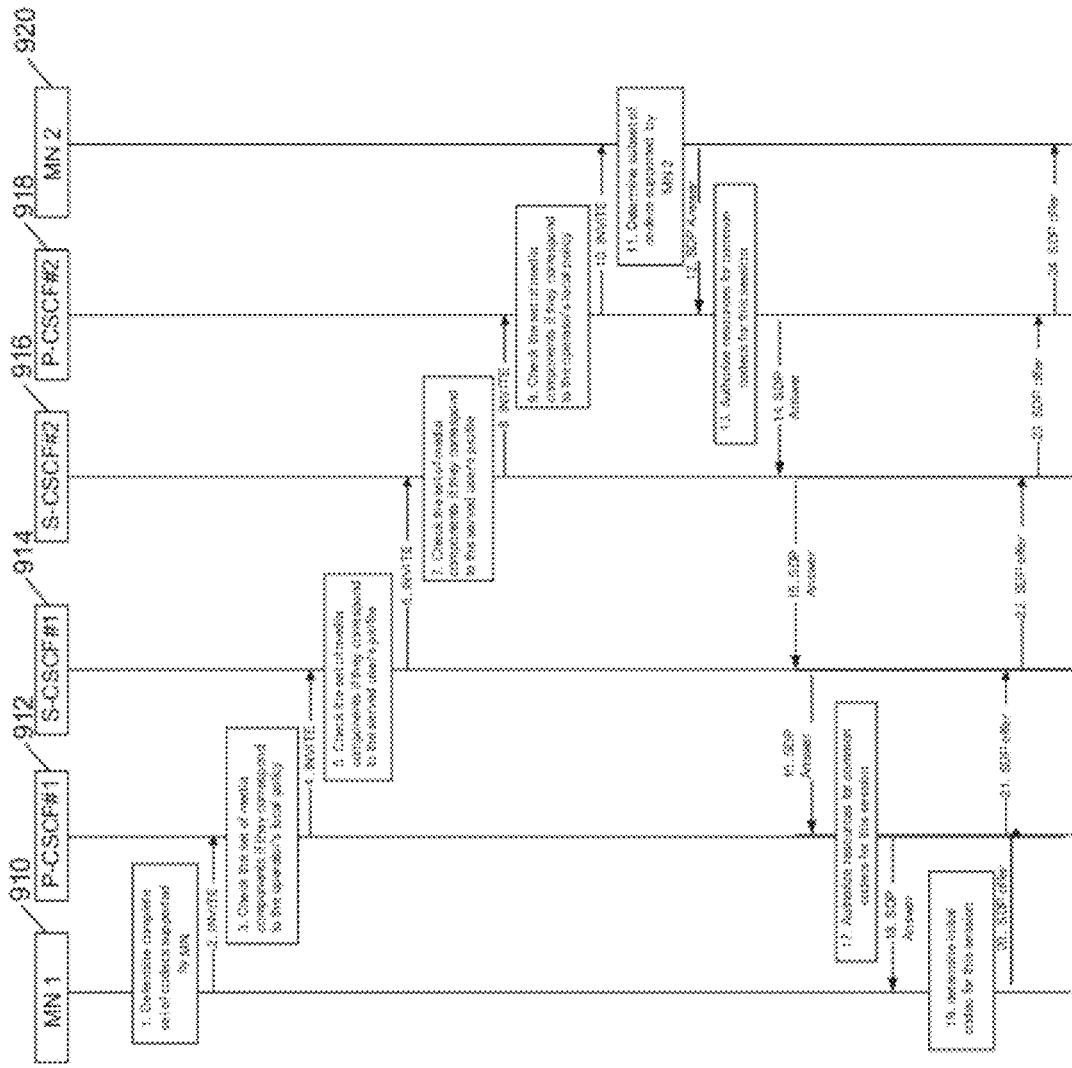
FIG. 9 is a signaling flow illustrating service interaction management occurring within a gateway in accordance with certain embodiments.

FIG. 9 illustrates service interaction provided in accordance with certain embodiments. The service interaction in FIG. 9 includes media negotiation using a service profile. FIG. 9 includes network devices such as mobile node 1 910, P-CSCF 1 912, S-CSCF 1 914, S-CSCF 2 916, P-CSCF 2 918, and mobile node 2 920. S-CSCF 1 914 can determine when receiving invite message in step 4 with the SCIM to send to S-CSCF 2 916. In some embodiments, the determination made by the S-CSCF can be prompted by filter criteria. This allows the gateway to provide services without involving an external server in some cases to provide services. SCIM can provide service interaction management and S-CSCF can handle the interaction to provide capabilities on the gateway that might otherwise require an external application server. This can allow a network operator to reduce the network equipment used to provide services to subscribers and reduce operating costs. By providing the interaction management within the gateway latency and delays can also be reduced.

The gateway described above is implemented in a chassis in some embodiments. This chassis can implement multiple and different integrated functionalities. In some embodiments, an access gateway, a packet data serving node (PDSN), a foreign agent (FA), or a home agent (HA) can be implemented on a chassis. Other types of functionalities can also be implemented on a chassis in other embodiments are a Gateway General packet radio service Support Node (GGSN), a serving GPRS support node (SGSN), a packet data inter-working function (PDIF), an access service network gateway (ASNGW), a base station, a access network, a User Plane Entity (UPE), an IP Gateway, an access gateway, a session initiation protocol (SIP) server, a proxy-call session control function (P-CSCF), and an interrogating-call session control function (I-CSCF). In certain embodiments, one or more of the above-mentioned other types of functionalities are integrated together or provided by the same functionality. For example, an access network can be integrated with a PDSN. A chassis can include a PDSN, a FA, a HA, a GGSN, a PDIF, an ASNGW, a UPE, an IP Gateway, an access gateway, or any other applicable access interface device. In certain embodiments, a chassis is provided by Starent Networks, Corp. of Tewksbury, Mass. in a ST16 or a ST40 multimedia platform.

The chassis can include slots for loading application cards and line cards. A midplane can be used in the chassis to provide intra-chassis communications, power connections, and transport paths between the various installed cards. The midplane can include buses such as a switch fabric, a control bus, a system management bus, a redundancy bus, and a time division multiplex (TDM) bus. The switch fabric is an IP-based transport path for user data throughout the chassis implemented by establishing inter-card communications between application cards and line cards. The control bus interconnects the control and management processors within the chassis. The chassis management bus provides management of system functions such as supplying power, monitoring temperatures, board status, data path errors, card resets, and other failover features. The redundancy bus provides transportation of user data and redundancy links in the event of hardware failures. The TDM bus provides support for voice services on the system.

The chassis supports at least two types of application cards: a switch processor card and a packet accelerator card. The switch processor card serves as a controller of the chassis and is responsible for such things as initializing the chassis and loading software configurations onto other cards in the chassis. The packet accelerator card provides packet processing and forwarding capabilities. Each packet accelerator card is capable of supporting multiple contexts. Hardware engines can be deployed with the card to support parallel distributed processing for compression, classification traffic scheduling, forwarding, packet filtering, and statistics compilations.

The packet accelerator card performs packet-processing operations through the use of control processors and a network processing unit (NPU). The network processing unit determines packet processing requirements; receives and transmits user data frames to/from various physical interfaces; makes IP forwarding decisions; implements packet filtering, flow insertion, deletion, and modification; performs traffic management and traffic engineering; modifies/adds/strips packet headers; and manages line card ports and internal packet transportation. The control processors, also located on the packet accelerator card, provide packet-based user service processing. The line cards when loaded in the chassis provide input/output connectivity and can also provide redundancy connections as well.

In some embodiments, a ST40 embodiment of the chassis can support a system management card (SMC) and a packet services card (PSC). The system management card is a system control and management card for managing and controlling other cards in the chassis. The packet services card is a high-speed processing card that provides multi-threaded point-to-point, packet data processing, and context processing capabilities, among other things.

The operating system software can be based on a Linux software kernel and run specific applications in the chassis such as monitoring tasks and providing protocol stacks. The software allows chassis resources to be allocated separately for control and data paths. For example, certain packet accelerator cards can be dedicated to performing routing or security control functions, while other packet accelerator cards are dedicated to processing user session traffic. As network requirements change, hardware resources can be dynamically deployed to meet the requirements in some embodiments. The system can be virtualized to support multiple logical instances of services, such as technology functions (e.g., a PDSN, ASNGW, PDIF, HA, GGSN, or IPSG).

The chassis' software can be divided into a series of tasks that perform specific functions. These tasks communicate with each other as needed to share control and data information throughout the chassis. A task is a software process that performs a specific function related to system control or session processing. Three types of tasks operate within the chassis in some embodiments: critical tasks, controller tasks, and manager tasks. The critical tasks control functions that relate to the chassis' ability to process calls such as chassis initialization, error detection, and recovery tasks. The controller tasks mask the distributed nature of the software from the user and perform tasks such as monitor the state of subordinate manager(s), provide for intra-manager communication within the same subsystem, and enable inter-subsystem communication by communicating with controller(s) belonging to other subsystems. The manager tasks can control system resources and maintain logical mappings between system resources.

Individual tasks that run on processors in the application cards can be divided into subsystems. A subsystem is a software element that either performs a specific task or is a culmination of multiple other tasks. A single subsystem can include critical tasks, controller tasks, and manager tasks. Some of the subsystems that can run on a chassis include a system initiation task subsystem, a high availability task subsystem, a recovery control task subsystem, a shared configuration task subsystem, a resource management subsystem, a virtual private network subsystem, a network processing unit subsystem, a card/slot/port subsystem, and a session subsystem.

The system initiation task subsystem is responsible for starting a set of initial tasks at system startup and providing individual tasks as needed. The high availability task subsystem works in conjunction with the recovery control task subsystem to maintain the operational state of the chassis by monitoring the various software and hardware components of the chassis. Recovery control task subsystem is responsible for executing a recovery action for failures that occur in the chassis and receives recovery actions from the high availability task subsystem. Shared configuration task subsystem provides the chassis with an ability to set, retrieve, and receive notification of chassis configuration parameter changes and is responsible for storing configuration data for the applications running within the chassis. Resource management subsystem is responsible for assigning resources (e.g., processor and memory capabilities) to tasks and for monitoring the task's use of the resources.

Virtual private network (VPN) subsystem manages the administrative and operational aspects of VPN-related entities in the chassis, which include creating separate VPN contexts, starting IP services within a VPN context, managing IP pools and subscriber IP addresses, and distributing the IP flow information within a VPN context. In some embodiments, within the chassis, IP operations are done within specific VPN contexts. The network processing unit subsystem is responsible for many of the functions listed above for the network processing unit. The card/slot/port subsystem is responsible for coordinating the events that occur relating to card activity such as discovery and configuration of ports on newly inserted cards and determining how line cards map to application cards. The session subsystem is responsible for processing and monitoring a mobile subscriber's data flows in some embodiments. Session processing tasks for mobile data communications include: A10/A11 termination for CDMA networks, GSM tunneling protocol termination for GPRS and/or UMTS networks, asynchronous PPP processing, packet filtering, packet scheduling, Difserv codepoint marking, statistics gathering, IP forwarding, and AAA services, for example. Responsibility for each of these items can be distributed across subordinate tasks (called managers) to provide for more efficient processing and greater redundancy. A separate session controller task serves as an integrated control node to regulate and monitor the managers and to communicate with the other active subsystem. The session subsystem also manages specialized user data processing such as payload transformation, filtering, statistics collection, policing, and scheduling.

In some embodiments, the software needed for implementing a process or a database includes a high level procedural or an object-orientated language such as C, C++, C#, Java, or Perl. The software may also be implemented in assembly language if desired. Packet processing implemented in a chassis can include any processing determined by the context. For example, packet processing may involve high-level data link control (HDLC) framing, header compression, and/or encryption. In certain embodiments, the software is stored on a storage medium or device such as read-only memory (ROM), programmable-read-only memory (PROM), electrically erasable programmable-read-only memory (EEPROM), flash memory, or a magnetic disk that is readable by a general or special purpose-processing unit to perform the processes described in this document.

Although the present invention has been described and illustrated in the foregoing embodiments, it is understood that the present disclosure has been made only by way of example, and that numerous changes in the details of implementation of the invention may be made without departing from the spirit and scope of the invention, which is limited only by the claims which follow.

We claim:

1. A gateway in a communication network comprising:
a service control interaction manager (SCIM) residing in the gateway for providing management of services to a plurality of mobile nodes having different capabilities and for providing management of interactions between the plurality of mobile nodes and at least one application server in the communication network by hiding the different capabilities from the at least one application server;
a call session control function (CSCF) in communication with the SCIM and residing in the gateway for handling session initiation protocol sessions and for handling interworking; and
a local memory storage in communication with the CSCF and residing in the gateway for caching filter criteria and triggers for each of the plurality of the mobile nodes, wherein the filter criteria and triggers are used to determine service changes and,
wherein the SCIM is configured for:
detecting service requests received at the gateway from the plurality of mobile nodes for at least one service provided by the at least one application server;
modifying the service requests and forwarding to the at least one application server the modified service requests to present to the at least one application server as though the service requests were received from a plurality of mobile nodes having identical capabilities;
performing one or more conversions on packets received from the at least one application server in response to the modified service requests to generate responses, each of which includes features that corresponding mobile node of the plurality of mobile nodes is capable of processing; and
forwarding the responses to respective mobile nodes of the plurality of mobile nodes.

2. The gateway of claim 1, wherein the interworking is between an IP Multimedia Subsystem (IMS) network and a non-compliant IMS mobile node.

3. The gateway of claim 1, wherein the interworking is between an IP Multimedia Subsystem (IMS) network and a non-compliant IMS application server.

4. The gateway of claim 1, wherein the SCIM is further configured for:
monitoring packets from the plurality of mobile nodes to detect packets containing one or more conditions that match the filter criteria and/or the triggers; and
triggering changes in one or more services of the at least one service that are associated with the matching filter criteria and/or the matching triggers upon a match.

5. The gateway of claim 4, wherein the changes in one or more services include one of terminating one or more services, modifying one or more services, or adding one or more new services.

6. The gateway of claim 5, wherein the modification of one or more services includes at least one of adding a mobile node to a conference, dropping a mobile node from a conference, and changing Quality of Service (QoS) in provision of a service.

7. The gateway of claim 5, wherein the SCIM is further configured for selecting one or more application servers for the addition of one or more new services.

8. The gateway of claim 7, wherein the SCIM is further configured for monitoring application server availability and providing load balancing based on the application server availability.

9. The gateway of claim 5, wherein the one or more new services include voicemail service, website viewing, video conferencing, call forwarding, and content filtering.

10. The gateway of claim 1, wherein the service requests received at the gateway from the plurality of mobile nodes include INVITE messages.

11. The gateway of claim 1, wherein the triggers include trigger points that identify when to start, stop, or modify a service.

12. The gateway of claim 11, wherein the trigger points include service point triggers that contain various conditions that are used to determine if a match occurs.

13. The gateway of claim 1, wherein the filter criteria of each of the plurality of mobile nodes include initial filter criteria that contain a list of services applicable to respective mobile node subscriber.

14. A method comprising:
establishing at a call session control function (CSCF) session initiation protocol (SIP) sessions between a plurality of mobile nodes having different capabilities and at least one application server, wherein the CSCF resides in a gateway in a communication network;
obtaining from one or more subscriber databases user profiles of the plurality of mobile nodes and caching the user profiles at a local memory storage residing in the gateway, wherein each of the user profiles include corresponding filter criteria for each of the plurality of mobile nodes;
generating one or more service point triggers for each of the plurality of mobile nodes based at least in part on the respective filter criteria and caching the service point triggers at the local memory storage;
detecting at a service control interaction manager (SCIM) service requests from the plurality of mobile nodes for at least one service provided by the at least one application server, wherein the SCIM resides in the gateway and is in communication with the CSCF;
modifying at the SCIM the service requests and forwarding the modified service requests to the at least one application server to present to the at least one application server as though the service requests were received from a plurality of mobile nodes having identical capabilities;
performing at the SCIM one or more conversions on packets received from the at least one server in response to the modified service requests to generate responses, each of which includes features that corresponding mobile node of the plurality of mobile nodes is capable of processing; and
forwarding the responses to respective mobile nodes of the plurality of mobile nodes.

15. The method of claim 14, further comprising:
monitoring packets from the plurality of mobile nodes to detect packets containing one or more conditions that match the filter criteria and/or the service point triggers; and triggering changes in one or more services of the at least one service that are associated with the matching filter criteria and/or the matching service point triggers upon a match.

16. The method of claim 15, wherein the changes in one or more services include one of terminating one or more services, modifying one or more services, or adding one or more new services.

17. The method of claim 16, further comprising selecting one or more application servers for the addition of one or more new services.

18. The method of claim 17, further comprising:
monitoring application server availability; and
providing load balancing based on the application server availability.

19. The method of claim 14, further comprising handling at the CSCF interworking between an IP Multimedia Subsystem (IMS) network and at least one of a non-compliant IMS application server and a non-compliant IMS mobile node.

20. A non-transitory computer-readable storage medium containing logic stored thereon, said logic includes code for execution and when executed by a processor is operable to perform operations comprising:
    establishing at a call session control function (CSCF) session initiation protocol (SIP) sessions between a plurality of mobile nodes having different capabilities and at least one application server, wherein the CSCF resides in a gateway in a communication network;
    obtaining from one or more subscriber databases user profiles of the plurality of mobile nodes and caching the user profiles at a local memory storage residing in the gateway, wherein each of the user profiles include corresponding filter criteria for each of the plurality of mobile nodes;
    generating one or more service point triggers for each of the plurality of mobile nodes based at least in part on the respective filter criteria and caching the service point triggers at the local memory storage;
    detecting at a service control interaction manager (SCIM) service requests from the plurality of mobile nodes for at least one service provided by the at least one application server, wherein the SCIM resides in the gateway and is in communication with the CSCF;
    modifying at the SCIM the service requests and forwarding the modified service requests to the at least one application server to present to the at least one application server as though the service requests were received from a plurality of mobile nodes having identical capabilities;
    performing at the SCIM one or more conversions on packets received from the at least one server in response to the modified service requests to generate responses, each of which includes features that corresponding mobile node of the plurality of mobile nodes is capable of processing; and
    forwarding the responses to respective mobile nodes of the plurality of mobile nodes.

* * * * *